United States Patent Office 3,538,064
Patented Nov. 3, 1970

3,538,064
ACRYLIC ACID ESTERS OF HYDROXYMETHYL OXAZOLIDONES
Harold I. Yalowitz, Terre Haute, Ind., assignor to Commercial Solvents Corporation, New York, N.Y., a corporation of Maryland
No Drawing. Filed June 4, 1965, Ser. No. 461,552
Int. Cl. C08f 3/62, 7/12
U.S. Cl. 260—88.3                             6 Claims

ABSTRACT OF THE DISCLOSURE

Methods for preparing and polymerizing acrylic acid esters of hydroxymethyl oxazolidones and products thereof.

---

This invention relates to novel compositions. In a particular aspect it relates to polymers of the novel compositions and to methods for preparing the compositions and the polymers thereof.

An object of the present invention is the provision of novel compositions corresponding to the formula $$H_2C=C-\overset{O}{\underset{\|}{C}}-O-CH_2-\underset{\underset{H}{\diagdown}\underset{C}{\underset{\|}{\nearrow}}\underset{O}{\overset{O}{\|}}}{\overset{R'}{\underset{N}{C}}}-CH_2$$
$$\phantom{H_2C=}\underset{R}{|}$$

wherein R can be hydrogen, methyl or ethyl and R' can be hydrogen, methyl, ethyl, hydroxymethyl or the radical $$-CH_2-O-\overset{O}{\underset{\|}{C}}-\underset{\underset{R}{|}}{C}=CH_2$$

Included among the novel compositions of the invention are the acrylic acid mono- and di-esters of 4,4-bis(hydroxymethyl)-2-oxazolidone, the acrylic acid ester of 4-hydroxymethyl-2-oxazolidone, the acrylic acid ester of 4-methyl-4-hydroxymethyl-2-oxazolidone, the methacrylic acid ester of 4-methyl-4-hydroxymethyl-2-oxazolidone, and the methacrylic acid ester of 4-ethyl-4-hydroxymethyl-2-oxazolidone.

A further object of the present invention is the provision of a method for producing the said novel compositions.

A still further object of the present invention is the provision of novel polymers of the said novel compositions.

An additional object of the present invention is the provision of a method for producing said novel polymers.

Further objects and advantages of the present invention will be apparent from the specification and the appended claims.

The novel compositions of the present invention are prepared by the reaction of an oxazolidone of the formula $$HOCH_2-\underset{\underset{H-N}{|}\phantom{xx}\underset{\diagdown}{\phantom{x}}\underset{C}{\overset{\nearrow}{\phantom{x}}}\underset{\|}{\phantom{x}}O}{\overset{R_2}{\underset{|}{C}}}-CH_2$$

wherein $R_2$ can be hydrogen, methyl, ethyl or hydroxymethyl with an ethylenically unsaturated carboxy-containing compound of the formula $$H_2C=\underset{\underset{R}{|}}{C}-\overset{O}{\underset{\|}{C}}-O-R^3$$

wherein $R^3$ can be hydrogen or a lower alkyl radical, that is to say an alkyl radical containing from 1 up to about 4 carbon atoms and wherein R is defined as before, under conditions to condense the carboxy group of the said carboxy-containing compound with 1 or more of the hydroxyl groups of the oxazolidone.

Among the oxazolidones useful in producing the novel compositions of the present invention are 4-hydroxymethyl-2-oxazolidone, 4-methyl-4-hydroxymethyl-2-oxazolidone, 4-ethyl-4-hydroxyethyl-2-oxazolidone and 4,4-bis(hydroxymethyl)-2-oxazolidone. Such oxazolidones are known and can be obtained by the reaction of amino alcohols with urea.

Among the ethylenically unsaturated carboxy-containing compounds useful in producing the novel compositions of the present invention are acrylic acid, methacrylic acid, methyl methacrylate and methyl acrylate. Such compounds are commercially available.

The reaction is typically conducted under esterification conditions at temperatures on the order of from about 80 to about 160° C. preferably in the presence of catalytic amounts of an acidic esterification catalyst. Suitable catalysts include sulfuric acid, phosphoric acid, p-toluene sulfonic acid, p-xylene sulfonic acid, boron trifluoride, etc., and the like. The amount of catalyst employed in the reaction will depend among other things on the reactants and on the particular catalyst. Typically from about 1 to about 5 percent by weight of the ethylenically unsaturated carboxy-containing compound is employed.

The reaction is preferably carried out in the presence of a dispersant for the reactants and the reaction products. Suitable dispersants include xylene, toluene, benzene, etc., and the like. Some dispersants can advantageously be used as azeotropic agents to aid in the removal of the water resulting from the reaction.

In conducting the reaction it is also preferable to include a polymerization inhibitor in the reacton mixture to prevent substantial formation of polymer material when the monomer is desired. Suitable polymerization inhibitors include methylene blue, hydroquinone, N,N'-diphenylphenylene diamine and 2,5-di-tert-butylhydroquinone. The amount of inhibitor employed will also depend on the particular reactants and the particular inhibitor. Typically from about 0.5 to about 1% by weight of an inhibitor is used based on the weight of the carboxy-containing compound.

The novel compositions of the present invention are useful in preparing novel polymers which have a multitude of uses. The polymerization may be effected in bulk, in solution, or in emulsion using methods known to the polymerization art. Temperatures of polymerization typically range from about 40 to about 80° C.

In conducting the polymerization it is preferable to utilize a polymerization catalyst. Suitable catalysts include ammonium sulfate, 2,2'-azobis(2 - methylpropionitrile), benzoyl peroxide, p-butylhydroperoxide, etc., and the like. Such catalysts are typically employed in amounts ranging from about 0.1 to about 0.5% by weight based on the weight of the monomer to be polymerized.

The polymers of the present invention are useful as adhesives, as film-forming agents and as intermediates in the preparation of copolymers with other ethylenically unsaturated compounds.

The invention will be understood more fully by reference to the following specific examples. It is understood that the examples are presented for purposes of illustration only and are not intended as a limitation of the invention.

EXAMPLE 1

A 500 ml. flask equipped with a stirrer, thermometer, Vigreux column, water separator, reflux condenser and an electric heating means was charged with 65.6 grams of 4-methyl - 4 - hydroxymethyl - 2 - oxazolidone, 100 ml. of toluene, 2.0 grams of p-toluene sulfonic acid and 43.2 grams of distilled acrylic acid which contained 0.35 gram of hydroquinone. The reaction mixture was heated with stirring at 134–141° C. for 9 hours with azeotropic removal of water. The reaction mixture was then allowed to cool to room temperature for a period of approximately 8 hours during which time a lower product layer and an upper toluene layer were formed. The lower product layer (92 ml.) was separated from the upper toluene layer and then dissolved in 150 ml. of ethyl ether and the material was filtered. The ethyl ether was then removed from the filtrate under vacuum. The acrylic acid ester of 4-methyl-4-hydroxymethyl - 2 - oxazolidone was obtained.

EXAMPLE 2

To a 100 ml. round bottom flask equipped with a stirrer was charged 50 ml. of water and 25.0 grams of the acrylic acid ester product of Example 1. The resulting mixture was heated to about 40° C. with stirring and 1.5 grams of activated carbon were added to the mixture. The mixture was then filtered and the filtrate was collected. To the filtrate was then added 0.1 gram of ammonium persulfate. The material was heated to about 50° C. and maintained at that temperature for about 3 hours. A flexible polymer material was obtained. The polymer material was then heated under vacuum at 80° C. for approximately 8 hours. A brittle polymer material was obtained.

The following example is offered to show the effectiveness of the polymers of the present invention as adhesives.

EXAMPLE 3

The polymer material of Example 2 was ground to a fine particle size. A 1 inch by ⅜ inch surface of a polished steel plate was covered with the ground polymer and the covered surface was placed in contact with a second polished steel plate. Heat and pressure were then applied to the plates to form a bond between them. The plates were then cooled to room temperature. A strong bond between the plates was obtained.

EXAMPLE 4

The acrylic acid di-ester of 4,4-bis(hydroxymethyl)-2-oxazolidone is prepared by essentially the same procedure used in Example 1 except that 4,4-bis(hydroxymethyl) - 2 - oxazolidone is substituted for 4-methyl-4-hydroxymethyl-2-oxazolidone. The ester can be polymerized according to the procedure of Example 2.

EXAMPLE 5

The methacrylic acid ester of 4-methyl - 4 - hydroxymethyl-2-oxazolidone is prepared by essentially the same procedure used in Example 1 except that methyl methacrylate is used instead of acrylic acid.

The ester can be polyesterized according to the procedure of Example 2.

EXAMPLE 6

The acrylic acid ester of 4-hydroxymethyl-2-oxazolidone is prepared by essentially the same procedure used in Example 1 except that 4-hydroxymethyl-2-oxazolidone is substituted for 4-methyl-4-hydroxymethyl - 2 - oxazolidone.

The ester can be polymerized according to the procedure of Example 2.

EXAMPLE 7

The methacrylic acid ester of 4-ethyl - 4 - hydroxymethyl-2-oxazolidone is prepared by essentially the same procedure used in Example 1 except that 4-ethyl-4-hydroxymethyl-2-oxazolidone is substituted for 4 - methyl-4-hydroxymethyl-2-oxazolidone and methyl methacrylate is substituted for acrylic acid.

The ester can be polymerized according to the procedure of Example 2.

Since many embodiments may be made in this invention and since many changes may be made in the embodiments described the foregoing is to be interpreted as illustrative only and the invention is defined by the claims appended hereto.

I claim:
1. A composition having the formula

$$H_2C=C(R)-C(=O)-O-CH_2-C(R')(-CH_2-O-)-N(H)-C(=O)-$$

(ring: $-C(R')(CH_2-)-N(H)-C(=O)-O-CH_2-$)

wherein R is a member selected from the group consisting of hydrogen, methyl and ethyl and R' is a member selected from the group consisting of hydroxymethyl, and the radical $$-CH_2-O-C(=O)-C(R)=CH_2$$

2. The acrylic acid di-ester of 4,4-bis(hydroxymethyl)-2-oxazolidone.

3. Polymers of compositions having the formula $$H_2C=C(R)-C(=O)-O-CH_2-C(R')(-CH_2-)-N(H)-C(=O)-O-$$

wherein R is a member selected from the group consisting of hydrogen, methyl and ethyl and R' is a member selected from the group consisting of hydroxymethyl, and the radical $$-CH_2-O-C(=O)-C(R)=CH_2$$

4. The composition of claim 3 wherein R is hydrogen and R' is hydroxymethyl.

5. The composition of claim 3 wherein R is methyl and R' is hydroxymethyl.

6. Polymers of the acrylic acid di-ester of 4-hydroxymethyl-2-oxazolidone.

No references cited.

HARRY WONG, JR., Primary Examiner

U.S. Cl. X.R.
117—132; 161—218, 219; 260—86.1, 307